United States Patent
Ramarao et al.

(10) Patent No.: US 8,463,827 B2
(45) Date of Patent: Jun. 11, 2013

(54) MINING GLOBAL EMAIL FOLDERS FOR IDENTIFYING AUTO-FOLDER TAGS

(75) Inventors: Vishwanath Tumkur Ramarao, Sunnyvale, CA (US); Andrei Broder, Menlo Park, CA (US); Idan Szpektor, Kfar Saba (IL); Edo Liberty, Or Yehuda (IL); Yehuda Koren, Zichron Yaakov (IL); Mark E. Risher, San Francisco, CA (US); Yoelle Maarek Smadja, Haifa (IL)

(73) Assignee: Yahoo! Inc., Sunnyvale, CA (US)

( * ) Notice: Subject to any disclaimer, the term of this patent is extended or adjusted under 35 U.S.C. 154(b) by 106 days.

(21) Appl. No.: 12/984,539

(22) Filed: Jan. 4, 2011

(65) Prior Publication Data

US 2012/0173533 A1 Jul. 5, 2012

(51) Int. Cl.
  *G06F 12/00* (2006.01)
  *G06F 17/30* (2006.01)
(52) U.S. Cl.
  USPC ............ 707/822; 707/803; 707/750; 709/206
(58) Field of Classification Search
  USPC ................... 707/803, 206, 750, 822; 709/206
  See application file for complete search history.

(56) References Cited

U.S. PATENT DOCUMENTS

| | | | | |
|---|---|---|---|---|
| 8,051,133 | B2* | 11/2011 | Schulz et al. | 709/206 |
| 2004/0093331 | A1* | 5/2004 | Garner et al. | 707/3 |
| 2005/0188240 | A1* | 8/2005 | Murphy et al. | 714/4 |
| 2011/0173274 | A1* | 7/2011 | Sood | 709/206 |
| 2011/0202597 | A1* | 8/2011 | Mousseau et al. | 709/203 |
| 2012/0110678 | A1* | 5/2012 | Kumble | 726/28 |

OTHER PUBLICATIONS

"OtherInbox: Save your inbox for real people," OtherInbox, Inc., 3 pages http://www.otherinbox.com, accessed Dec. 16, 2010.
"Hotmail: Organize your inbox," Microsoft Corporation, 1 page http://explore.live.com/windows-live-hotmail-organize-inbox, accessed Jan. 7, 2011.
"Hotmail: View and filter your messages quickly," Microsoft Corporation, 1 page http://explore.live.com/windows-live-hotmail-view-filter-messages-using, accessed Jan. 7, 2011.
"Xiant Filer FAQs" Xiant, 4 pages http://xiant.com/TemplateMain.aspx?contentId=12, accessed Jan. 7, 2011.
"Xiant Filer Features" Xiant, 4 pages http://xiant.com/TemplateMain.aspx?contentId=19, accessed Jan. 7, 2011.
"Xiant Filer" Xiant, 2 pages http://xiant.com/TemplateMain.aspx?contentId=10, accessed Jan. 7, 2011.

* cited by examiner

Primary Examiner — Cam Truong

(57) ABSTRACT

Embodiments are directed towards identifying auto-folder tags for messages by using a combinational optimization approach of bi-clustering folder names and features of messages based on relationship strengths. The combinational optimization approach of bi-clustering, generally, groups a plurality of folder names and a plurality of features into one or more metafolders to optimize a cost. The cost is based on an aggregate of cut relationship strengths, where a cut results when a relationship folder name and feature are grouped in separate metafolders. Furthermore, the plurality of folder names and the plurality of features are obtained by monitoring actions of a plurality of users, where the folder names are user generated folder names and features are from a plurality of messages. The metafolders may be used to tag new user messages with an auto-folder tag.

14 Claims, 7 Drawing Sheets

MINING GLOBAL EMAIL FOLDERS FOR IDENTIFYING AUTO-FOLDER TAGS

TECHNICAL FIELD

The present invention relates generally to managing messages, such as email messages, and, more particularly, but not exclusively to identifying a set of email types or "auto-folder tags" for use in automatically classifying and organizing messages.

BACKGROUND

Email messages are a central mean of communication between users over the Internet, partly because a user can maintain the messages over an extended period of time. Therefore, many email applications devote a significant part of their real estate on a computer display screen to offer users with various organizational mechanisms. For example, today, some messaging applications allow users to create and use folders, labels, or other various organizational tools. Yet, as of today in spite of numerous efforts, many people still find it tedious and/or complicated to use many of the organizational mechanisms provided to them. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
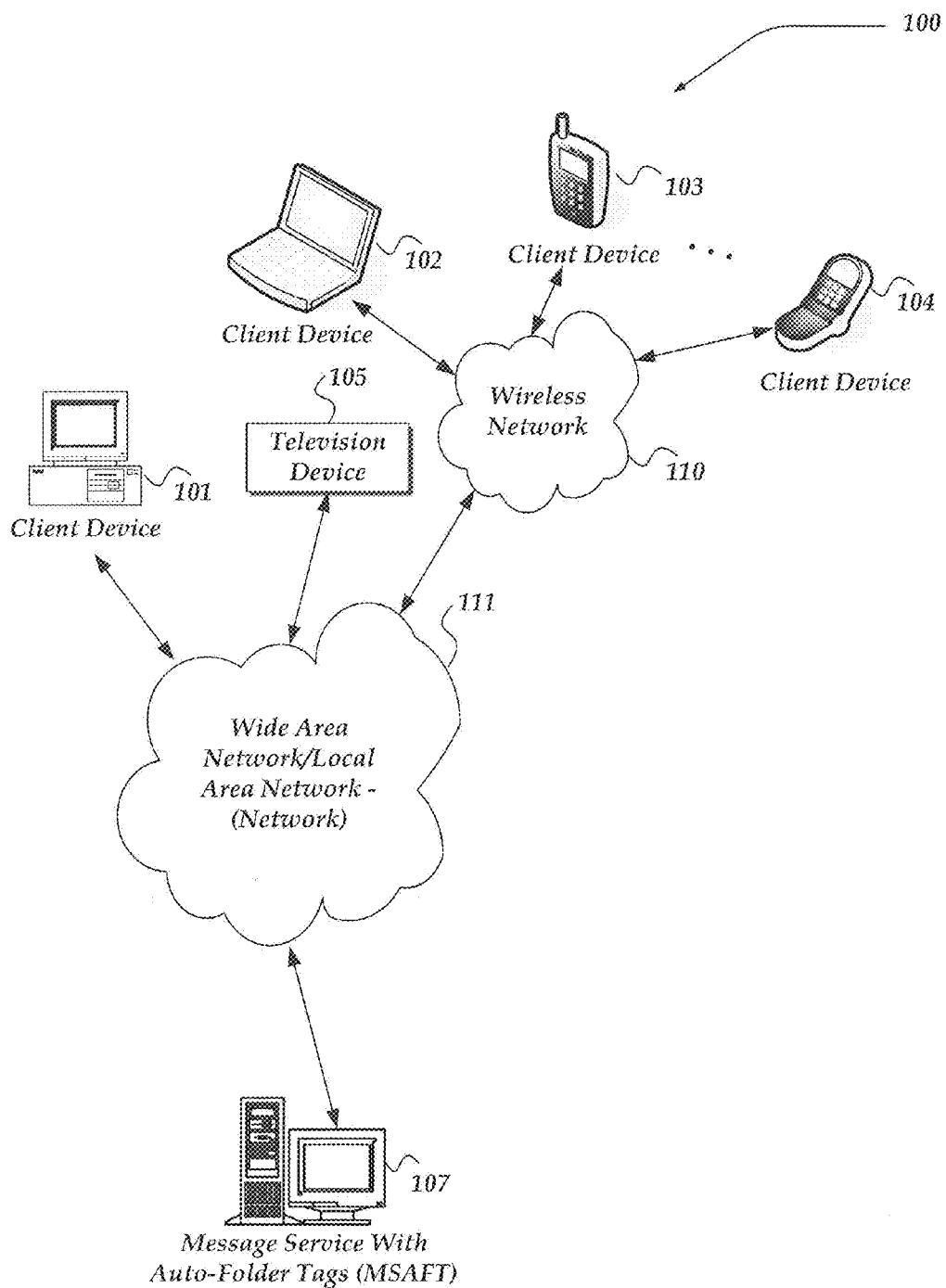
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "feature" refers to any of a variety of parts of a message, including, for example, a sender identification, words in a subject of the message, links within the message (a number of links or the URLs of the links), a number of attachments, a size of attachments, or the like.

As used herein, the term "metafolder" refers to a grouping of a plurality of folder names and a plurality of features.

As used herein, the term "auto-folder tags" refers to any electronic technique for organizing messages. Auto-folder tags include more than the concept of tags and may include folders, labels, or other identifiers usable to organize messages. In some embodiments, auto-folder tags may be referred to as "smart tags."

As used herein, the term "mining" includes searching, examining, extracting information from, and/or otherwise monitoring a collection of messages and actions.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards mining global email folders for identifying auto-folder tags for messages. Auto-folder tags may be identified by a multi-variable analysis where a plurality of folder names may be grouped together based on messages within those folder names having similar features, while simultaneously classifying that a message belongs to that group of folder names. To solve this multi-variable analysis a combinational optimization approach of bi-clustering may be utilized as described in more detail below. However, other approaches may also be employed, without limiting the scope of the invention.

In one embodiment, the combinational optimization approach of bi-clustering may group a plurality of folder names and a plurality of features into one or more metafolders based on relationship strengths that are determined to optimize a cost. The cost is based on an aggregate of cut relationship strengths, where a cut results when a relationship folder name and feature are grouped into separate metafolders. Once generated, the metafolders may be used to tag new user messages with an auto-folder tag. The metafolders may also be used to create new user folders when a new user message is received by the user. By employing the approach described herein, metafolders may be identified independent of a language or characters employed. Thus, for example, Chinese characters used to identify a folder name may be included in an analysis that also includes English, Korean, or virtually any other characters to identify a folder name.

It should also be recognized that while the disclosure is described in terms of email messages, the invention is not so limited. Thus, in other embodiments, other types of messages for which a user may maintain over a period of time may also be classified using auto-folder tags. Moreover, it should be recognized that the invention may also be applied to other types of content, generally, including, without limit to organizing, music content, video content, audio content, documents, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 111, wireless network 110, client devices 101-105, and Message Service with Auto-Folder Tags (MSAFT) 107.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various actions over a network (online). For example, the user of the client device may select to access and manage a user message account, send messages, organize messages, create user folders or the like. However, another application may also be used to perform various online actions.

For example, client devices 101-105 also may include at least one other client application that is configured to access and/or manage user message accounts, between another computing device. The client application may include a capability to provide and receive textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent between other client devices, MSAFT 107, or other computing devices.

Client devices 101-105 may further be configured to include a client application that enables an end-user to log into a user message account that may be managed by another computing device, such as MSAFT 107 or the like. Such user message account, for example, may be configured to enable the user to manage one or more online actions, including for example, compose messages, delete messages, create folders, move messages to folders, or the like.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), $3^{rd}$ (3G), $4^{th}$ (4G), $5^{th}$ (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, MSAFT 107, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

MSAFT 107 may include virtually any network device usable to operate as a messaging service to provide messages to client devices 101-105. Such messages may include, but is not limited to email, instant messages and the like. One embodiment of MSAFT 107 is described in more detail below in conjunction with FIG. 3. Briefly, however, MSAFT 107 represents one or more network devices that may monitor a plurality of user actions upon a first set of messages to generate one or more metafolders, which can then be used to tag messages with auto-folder tags from a second set of messages. In one embodiment, MSAFT 107 may be used to perform the combinational optimization approach of bi-clustering to generate the one or more metafolders. In one embodiment, MSAFT 107 may obtain user feedback to regenerate and/or otherwise modify the one or more metafolders. In another embodiment, MSAFT 107 may employ processes such as are described below in conjunction with FIGS. 4 and 5 to perform at least some of its actions.

Devices that may operate as MSAFT 107 include various network devices, including, but not limited to personal computers, desktop computers, multiprocessor systems, microprocessor-based or programmable consumer electronics, network PCs, server devices, network appliances, and the like. It should be noted that while MSAFT 107 is illustrated as a single network device, the invention is not so limited. Thus, in another embodiment, MSAFT 107 may represent a plurality of network devices.

Moreover, MSAFT 107 is not limited to a particular configuration. Thus, in one embodiment, MSAFT 107 may operate using a master/slave approach over a plurality of network devices, where one of the network devices for MSAFT 107 perform the combinational optimization approach of bi-clustering to generate one or more metafolders, while another MSAFT 107 uses the generated one or more metafolders to tag messages with auto-folder tags. In other embodiments, the MSAFT 107 may operate within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
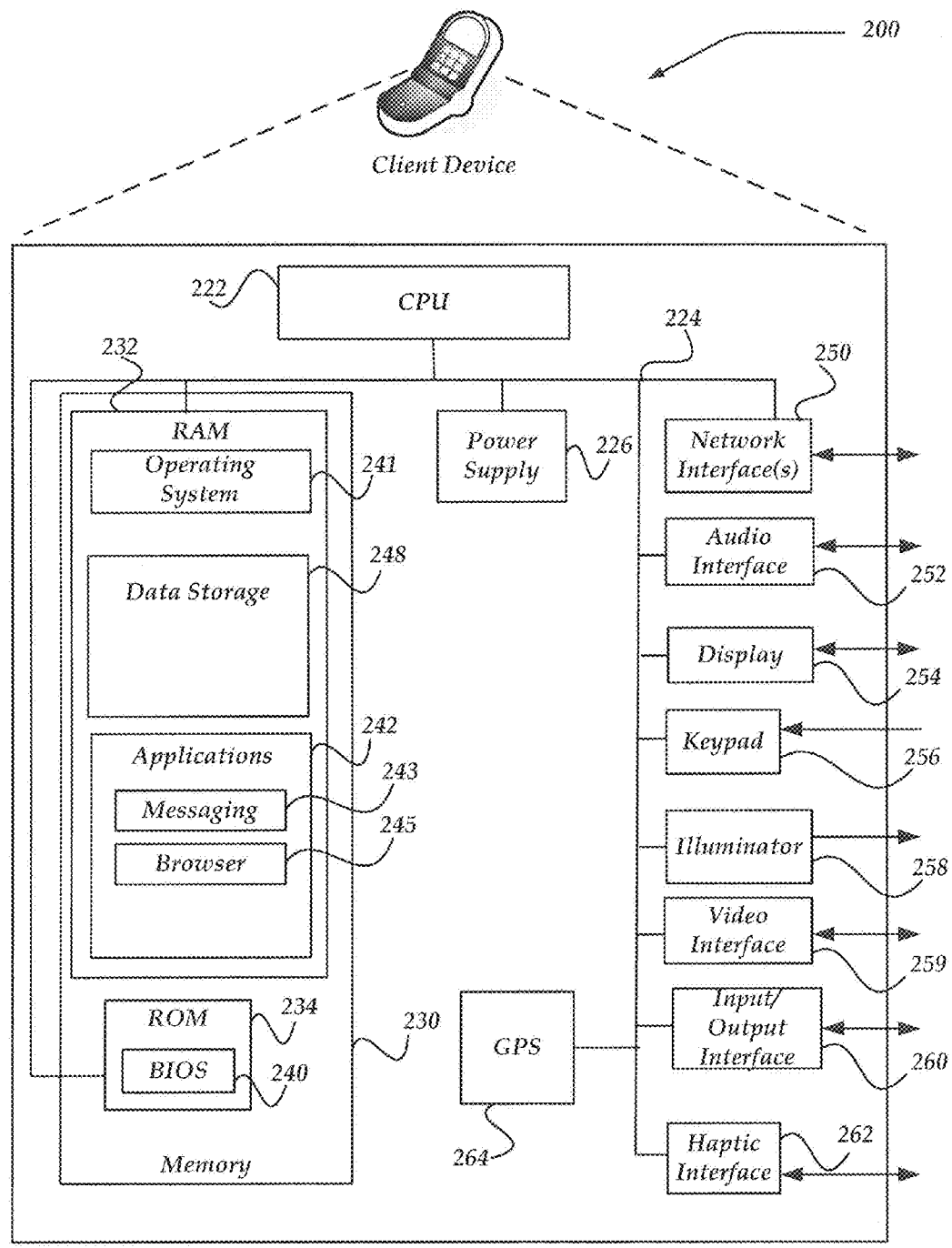
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store folders, address books, buddy lists, aliases, user profile information, multimedia content, or the like. Further, as illustrated, data storage 248 may also store messages, web page content, or any of a variety of user generated content. In one embodiment, a user may download, and/or otherwise access for storage in data storage 248 one or more folders useable for organizing messages. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messaging 243 and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to access/or otherwise manage a user message account, such as Yahoo! Mail, Hotmail, Gmail, or the like.

Messaging 243 may be configured to manage a user message account using any of a variety of messaging communications including, but not limited to email, Short Message Service (SMS), Instant Message (IM), Multimedia Message Service (MMS), interne relay chat (IRC), mIRC, RSS feeds, and/or the like. For example, in one embodiment, messaging 243 may be configured as a mail user agent (MUA) such as Elm, Pine, MH, Outlook, Eudora, Mac Mail, Mozilla Thunderbird, or the like. In another embodiment, messaging 243 may be a client application that is configured to integrate and employ a variety of messaging protocols, including, but not limited to various push and/or pull mechanisms for client device 200. In one embodiment, messaging 243 may interact with browser 245 for managing messages. As used herein, the term "message" refers to any of a variety of messaging formats, or communications forms, including but not limited to email, SMS, IM, MMS, IRC, or the like. A user may employ messaging 243 to access one or more messages and perform various actions upon the messages, including, but not limited to moving the messages from one folder to another folder; deleting a message; responding to a message; tagging, labeling, or otherwise providing an identifier to a message. In one embodiment, the identifier may then be employed to sort and/or otherwise organize the messages.

Illustrative Network Device

Figure 3:
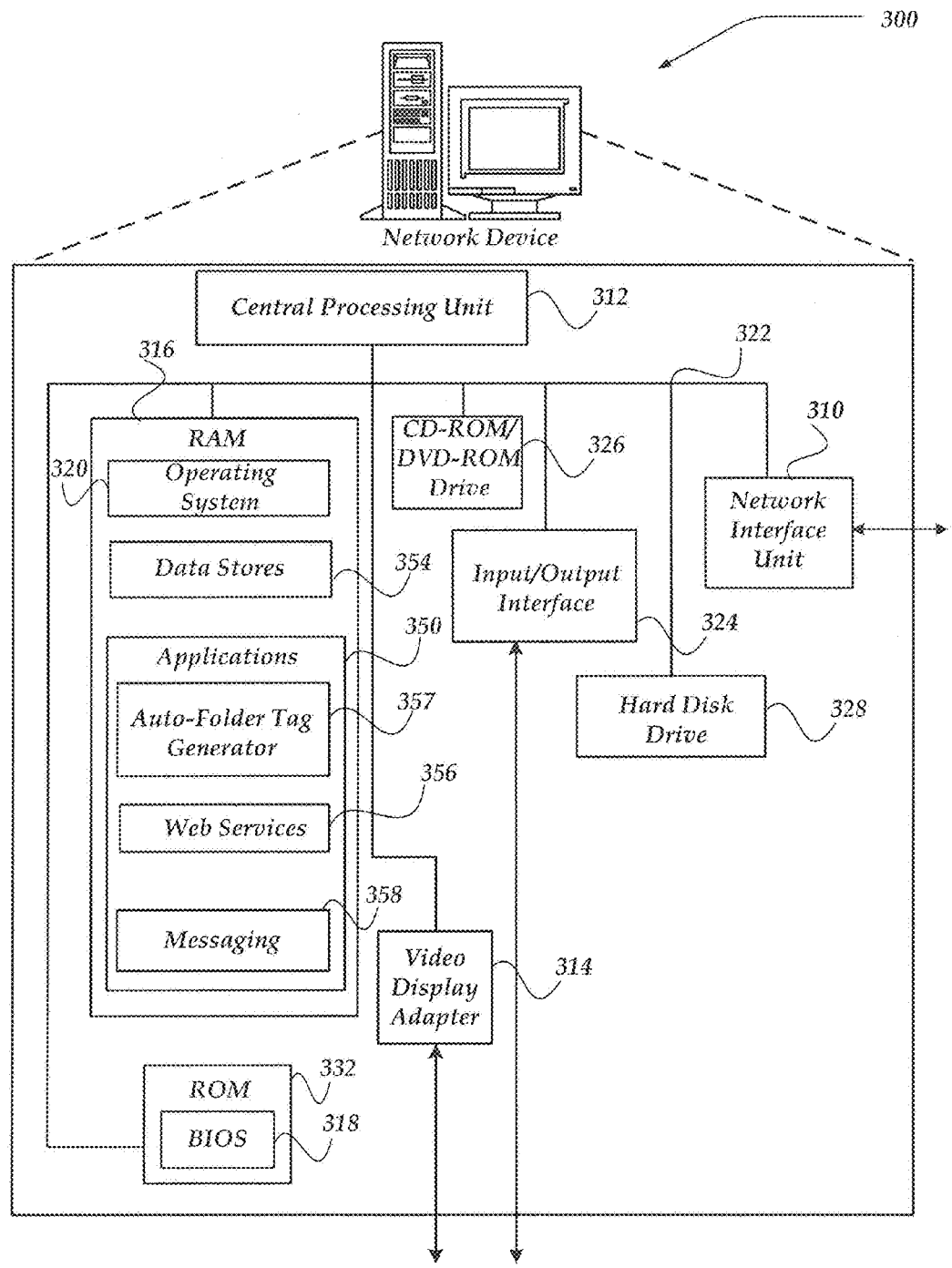
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, MSAFT 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various authoritative scores, citation models, and the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 356, messaging server 358, and Auto-Folder Tag Generator (AFTG) 357, may also be included as application programs within applications 350.

AFTG 357 is configured to monitor a plurality of user actions to obtain a plurality of folder names and a plurality of message features. In one embodiment, AFTG 357 may employ a message account crawler to search the plurality of user message accounts to monitor the user's actions for folder and message creation, management, manipulation, and the like. In one embodiment, AFTG 357 may perform the combinational optimization approach of bi-clustering to generate the one or more metafolders. In another embodiment, each of the one or more metafolders may correspond to a single auto-folder tag. In any event, AFTG 357 may employ processes such as are described below in conjunction with FIGS. 4-5 to perform at least some of its actions.

Messaging server 358 may include virtually any computing component or components configured and arranged to forward messages from message user agents, and/or other message servers, or to deliver messages to a local message store, such as data store 354, or the like. Thus, messaging server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 358 may also be managed by one or more components of messaging server 358. Thus, messaging server 358 may also be configured to manage SMS messages, IM, MMS, IRC, RSS feeds, mIRC, or any of a variety of other message types.

In one embodiment, messaging server 358 may tag user messages with auto-folder tags, such as an auto-folder tag generated by AFTG 357. In another embodiment, messaging server 358 may perform automatic functions on the user message account, such as new folder generation, moving messages to folders, deleting message, automatically replying to message, or the like based on the auto-folder tag. In any event, messaging server 358 may provide user interfaces for use in managing messages using auto-folder tags, such as described below in conjunction with FIGS. 6-7.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

In one embodiment, Web services 356 may receive content, including messages from another network device, such as a client device, or the like. Web services 356 may then enable a user to manage a user message account. As such, web services 356 may allow users to compose messages, delete messages, move messages to folders, create folders, or the like. Thus, in one embodiment, Web services 356 may tag messages in a user message account with an auto-folder tag.

Generalized Operation

The operation of certain aspects of the invention will now be described with respect to FIGS. 4-7. The operations of the processes described below for FIGS. 4 and 5 may, in one embodiment, be performed within one or more network devices, such as MSAFT 107 of FIG. 1.

Figure 4:
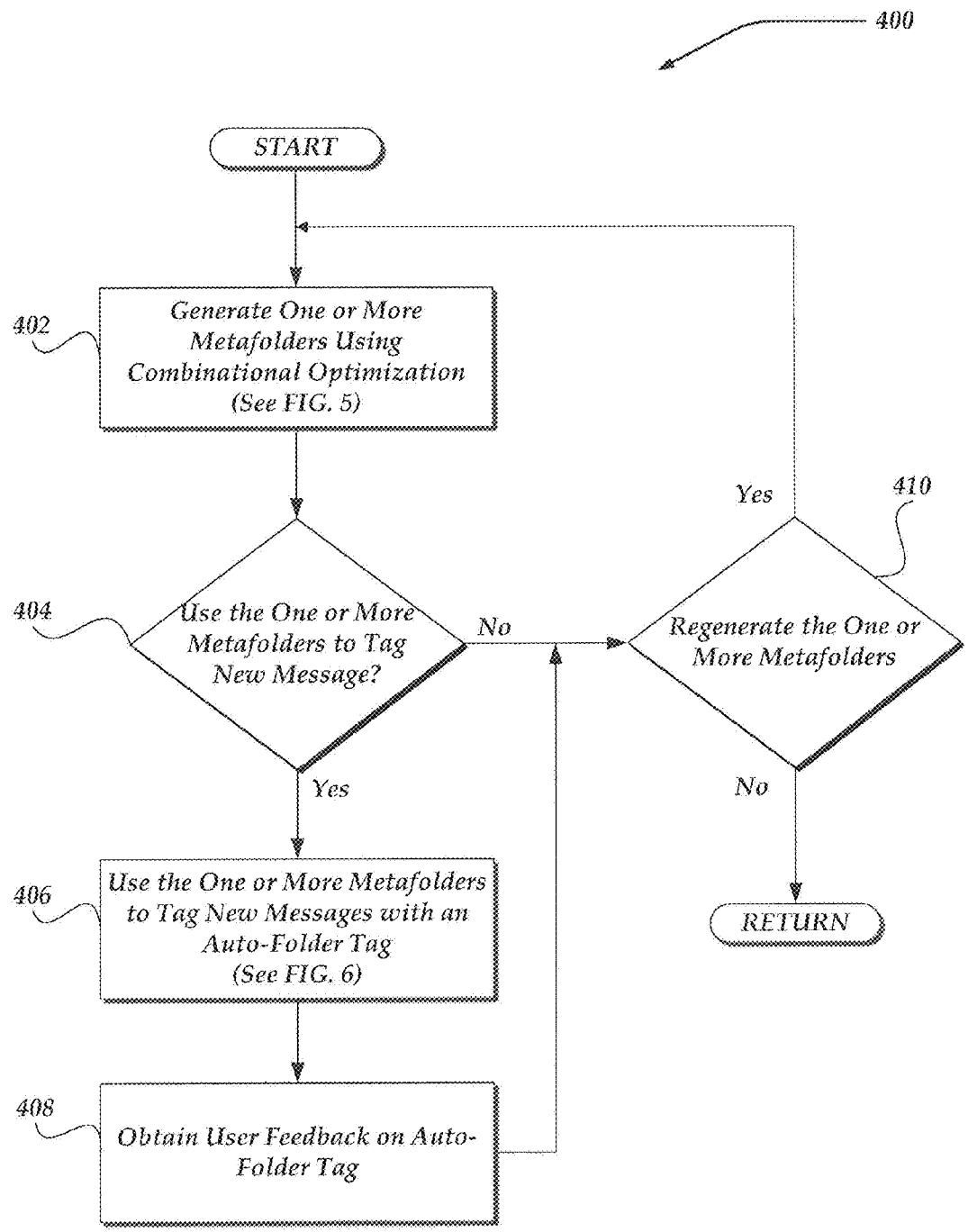
FIG. 4 illustrates a logical flow generally showing one embodiment of an overview process for use in identifying auto-folder tags for user messages.

FIG. 4 illustrates a logical flow diagram generally showing one embodiment of an overview process for tagging messages with an auto-folder tag. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices.

Process 400 of FIG. 4 begins after a start block, at block 402, which is described in more detail below in conjunction with FIG. 5. Briefly, however, at block 402, one or more metafolders is generated by grouping a plurality of folder names and a plurality of features using a combinational optimization approach. Process 400 then proceeds to decision block 404 where a determination is made whether to use the generated one or more metafolders. If the determination is made to use the generated one or more metafolders, then processing flows to block 406, which is described in more detail below in conjunction with FIG. 6 and FIG. 7; otherwise, processing flows to decision block 410. Briefly, at block 406, the one or more metafolders is used to tag new messages with an auto-folder tag.

Continuing to block 408, a user feedback may be obtained after a message is tagged with an auto-folder tag. In some embodiments, no user feedback may be obtained and process 500 may return to a calling function. In other embodiments, user feedback may be obtained. In one embodiment, the user feedback may be obtained to determine how accurate the one or more metafolders performed on a new user message. In some embodiments, the user feedback may be obtained from a user generated response. In one embodiment, a user may be prompted to respond to a question about how well the metafolders performed after a new user message is tagged with an auto-tag. In other embodiments, the user feedback may be obtained based on actions that a user performs on a new user message. In one embodiment, feedback may be obtained if the auto-folder tag is used to automatically move a new message into a folder and the user moves the new message to a different folder. In another embodiment, feedback may be obtained from an action where the user renames the auto-folder tag, adds a new auto-folder tag, deletes an existing auto-folder tag, or performs any of a variety of actions on the messages that may be determined to affect an auto-folder tag use. Processing then flows to decision block 410.

At decision block 410, a determination is made whether to regenerate the one or more metafolders. In one embodiment, the determination may be made randomly. In another embodiment, the determination may be made manually by an administrator, such as an email service provider. In one embodiment, a user feedback obtained from using a generated one or more metafolders may be utilized to regenerate the one or more metafolders. If the decision is to regenerate the one or more metafolders, processing loops back to block 402; otherwise, processing returns to a calling process.

Generating One or More Metafolders

Figure 5:
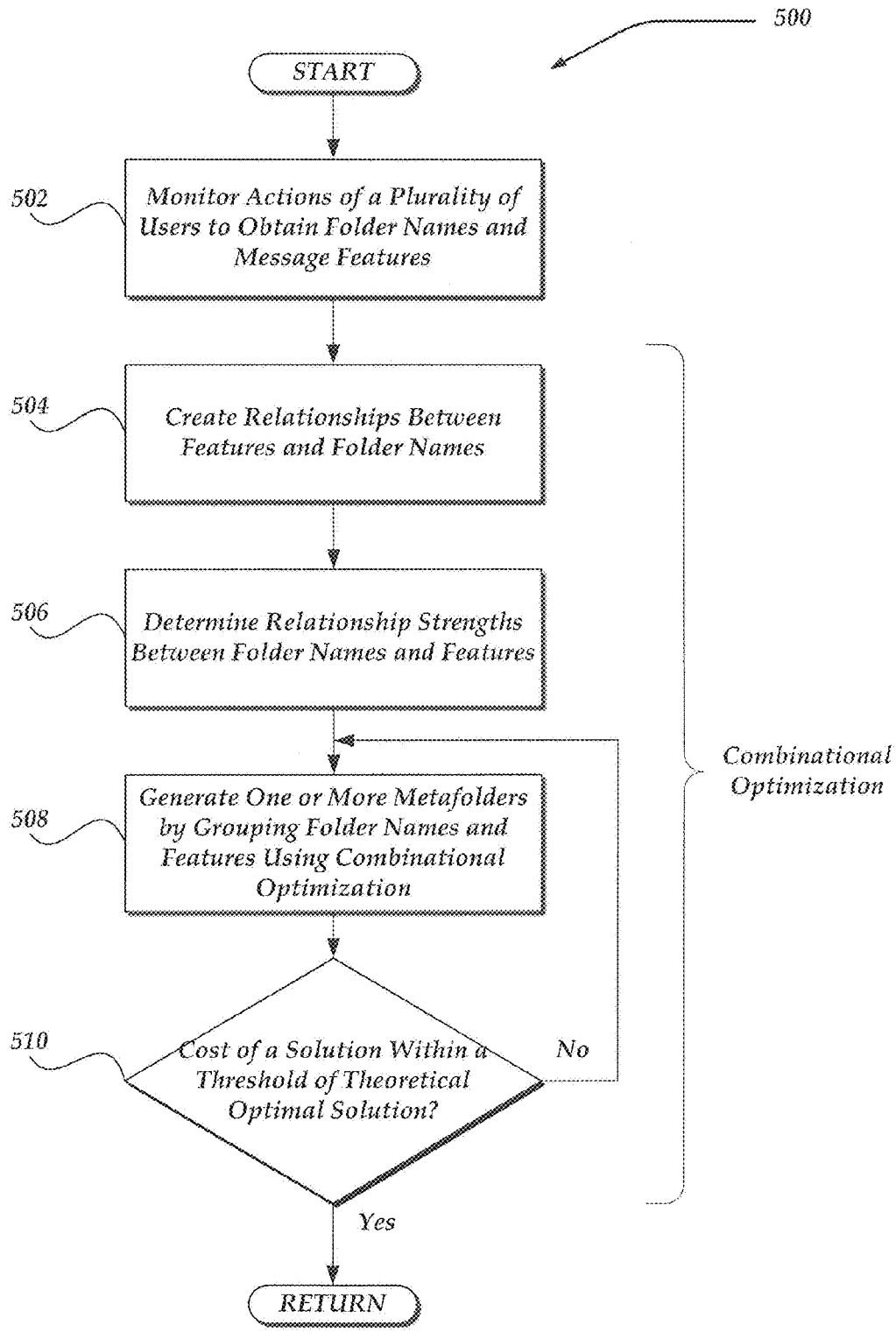
FIG. 5 illustrates a logical flow generally showing one embodiment of an overview process for use in generating a one or more metafolders.

FIG. 5 illustrates a logical flow diagram generally showing one embodiment of a process for generating one or more metafolders by grouping a plurality of folder names and a plurality of features using a combinational optimization of relationship strengths between folder names and features of messages. Process 500 of FIG. 5 depicts one embodiment of grouping the plurality of folder names and the plurality of features by bi-clustering, which solves the combinational optimization problem to obtain the best combination of folder names that optimizes a cost.

Briefly stated process 500 begins by monitoring the actions of a plurality of users to obtain a plurality of folder names and a plurality of message features using a combinational optimization approach. One embodiment of the combinational optimization is described by the actions below in conjunction with blocks 504, 506, 508, and 510. Briefly, the combinational optimization begins by creating relationships between the plurality of folder names and the plurality of features. Subsequently, a relationship strength is determined for each relationship. Next, the plurality of folder names and the plurality of features are grouped together into one or more metafolders based on a cost of cutting relationships. The cost of cutting relationships is based on the aggregate relationship strength of each cut relationship, where a relationship is cut if the relationship folder name and feature are grouped in separate metafolders. The one or more metafolders may be regenerated until the cost of a solution is within a threshold of a theoretical optimal solution.

Thus, process 500 begins, after a start block, at block 502, where the actions of a plurality of users are monitored to obtain a plurality of folder names and a plurality of message features. In some embodiments, actions may include anything relating to a user managing an individual message account. Each of the plurality of users may manage an individual message account. In one embodiment, the individual message account may include messages, folders, functions for moving messages to folders, functions for composing messages, or virtually any other action upon messages that may be determined to affect an organizational element of the messages. In one embodiment, actions may include moving a message from one folder to another folder. In another embodiment, the creation of a folder may be an action. Similarly, actions can be positive actions or negative actions. In one embodiment, a negative action may be leaving a message in an inbox and not moving the message to a folder. It is envisioned that any kind of action relating to folders or the classification or organization of messages can be an action.

As noted above, user actions are monitored to obtain the plurality of folder names and the plurality of features. Actions may include a user generating individual folders within that user's individual message account. Similarly, each user may provide a unique name for each individual folder that is generated by that user. Thus, the plurality of users combined may have a plurality of folders, where each folder has a user generated name. Therefore, the plurality of folder names may be obtained from the folder names of the individual user accounts from the plurality of users. In one embodiment, when a user generates a new folder, that action may be monitored, and thus, the folder name may be obtained. On another embodiment, if a user changes folder name of a user generated folder, then this action may be monitored and the new folder name may be obtained.

Furthermore, a plurality of features may be obtained by monitoring action of a plurality of users. Features may be obtained from messages within message accounts of the plurality of users. And thus, may be referred to as message features. Features may be any part of a message. In one embodiment, features may include a sender identification, words in a subject of the message, links within the message (a number of links or the URLs of the links), a number of attachments, a size of attachments, and the like.

Continuing to block 504, relationships are generated between the plurality of folder names and the plurality of features. A relationship between a folder name and a feature, in general, can be based on that feature being contained in a message that is located in a user generated folder with that particular folder name.

In one embodiment, relationships may be generated based on a feature selection process. The feature selection process may start with first selecting a feature. Next, a message that includes that feature may be determined. Subsequently, a relationship is generated between the folder name of a folder that contains the determined message and the selected feature. In some embodiments, a single feature may be included in a plurality of messages. Similarly, in other embodiments, a single message may be contained in a plurality of folders. Thus, there may a relationship between a single feature and a plurality of folder names.

In some embodiments, relationships may be generated as an action is monitored. In other embodiments, the relationship may be generated after all the folder names and features are obtained.

Proceeding next to block 506, a relationship strength is determined for each relationship between folder names and features. In some embodiments, the relationship strength may be a numerical value that represents a weight of the relationship. In some embodiments, a relationship strength may be between zero and one. In other embodiments, a relationship strength may be between zero and 100. Yet, in other embodiments, any range may be used to represent relationship strengths. For example, in one embodiment, relationship strengths may include negative values to represent negative relationships.

In some embodiments, the relationship strength may be determined based on a comparison of a feature frequency for a folder name with a feature frequency for a global system. As described above, each relationship includes a feature and a folder name. Thus, in one embodiment, a relationship strength may be determined by first selecting the folder name for that relationship. Next, identify all user-generated folders that have a folder name identical to the relationship folder name. Within the identified user-generated folders, calculate a number of all messages that include the relationship feature. This number is the feature frequency for the folder name. Once the feature frequency for the folder name is determined, the feature frequency for the global system may be determined. The feature frequency for the global system is the total number of messages that contain the feature within all folder names. Thus, in some embodiments, the relationship strength may then be determined by comparing the feature frequency for the folder name with the feature frequency for the global system. In one embodiment, this comparison may be a ratio of the feature frequency for the folder name to the feature frequency for the overall system.

In other embodiments, the relationship strength may be determined based on a log likelihood ratio. The log likelihood ratio quantifies an amount of information that may be gained based on previous knowledge. In other words, the log likelihood ratio estimates a relationship strength based on a previously determined relationship strength of another relationship. For purposes of explanation, the relationship strength to be estimated will be herein referred to as an unknown relationship. Further, the previously determined relationship strength of another relationship will be herein referred to as a previous relationship.

In general, the log likelihood ratio estimation may be determined based on mutual information between the previous relationship and the unknown relationship. Mutual information may be any type of data that two relationships may share. In one embodiment, the mutual information may be the folder name. In another embodiment, the mutual information may be the features.

In some embodiments, the unknown relationship and the previous relationship may share the same folder name. Thus, the relationship strength of the unknown relationship may be estimated based on the previous relationship. In one embodiment, if the unknown relationship and the previous relationship share the same folder name, then the relationship strength of the unknown relationship may be estimated to be the same as the relationship strength of the previous relationship.

In other embodiments, the unknown relationship and the previous relationship share the same feature. Thus, the relationship strength of the unknown relationship may be estimated based on the previous relationship. In one embodiment, if the unknown relationship and the previous relationship share the same feature, then the relationship strength of the unknown relationship may be estimated to be the same as the relationship strength of the previous relationship.

Process 500 then proceeds to block 508 where the plurality of folder names and the plurality of features are grouped together into one or more metafolders based on a cost of cutting relationship between folder names and features. As described above, at block 504, each feature may have a relationship with one or more folder names. Similarly, folder names may have a relationship with more than one feature. As a result, in some embodiments, when the one or more metafolders are generated, some features that are related to a folder name may not be grouped in the same metafolder as the folder name, these relationships may be referred to as non-associated relationships. In contrast, an associated relationship may be a relationship between a feature and a folder name, where the feature and the folder name are grouped into the same metafolder.

In some embodiments, as folder names and features are grouped into metafolders, all non-associated relationships may be simultaneously cut. A relationship cut results in a cost associated with the cut. The cost of a single cut is the strength of the relationship that was cut. As each of the plurality of folders and the plurality of features are grouped into metafolders, a total cost can be calculated by aggregating the cost of all relationship cuts. This total cost is a cost of the solution, where the solution is the resulting metafolders.

The one or more metafolders might not be predetermined by a system or a user. Rather, the one or more metafolders may be determined globally based on the folder names and features obtained by the positive and negative actions of a plurality of users, such as the actions described with reference to block 402 of FIG. 4. Metafolders are created independent of language of individual message tags, such as individual message rules for placing a message in a folder. In contrast, metafolders may be created based on the relationships between folder names and features as described below.

In one embodiment, the one or more metafolders may be created based on user actions in a specific geographic region. In another embodiment, the one or more metafolders may be created based on a hierarchical structure, such that one of the one or more metafolders may be a subset of another one of the one or more metafolders. In some embodiments, the hierarchical structure of metafolders may be based on a frequency of messages in the metafolders. In one embodiment, the frequency of messages may be based on a number of features in the metafolders. In another embodiment, the frequency of messages may be based on a number of messages that contain the features in the metafolders. In other embodiments, the hierarchical structure of metafolders may be based on lexical relationships between the folder names within the metafolders, between the folder names and features within the metafolders, or between the features within the folders.

In some embodiments, each metafolder may contain a unique set of folder names and features. In other words, each folder name and feature is associated with one metafolder. As a result, each feature in a metafolder has at least one associated relationship with a folder name that is in the same metafolder. In other embodiments, a feature may be associated with one or more metafolders.

In some embodiments, the one or more metafolders may be randomly selected. In other embodiments, two or more folder names may be selected manually by a user or system administrator to create one of the one or more metafolders. In one embodiment, a plurality of folder names that have a threshold number of features in common may be designated as near duplicates. In one embodiment, near duplicate folder names may always be grouped together in one of the one or more metafolders. In other embodiments, the one or more metafolders may be created based on the relationships between features and folder names.

In one embodiment, the creation of the one or more metafolders may begin by selecting a feature. All folder names that are related to the selected feature and the selected feature are grouped into a single metafolder. Next, all other features that are related to the folder names within the metafolder are also grouped into the same metafolder. For example, feature x is selected, which is related to folder name "A," "B," and "C." Thus, feature x and folder names "A," "B," and "C" are grouped into a single metafolder. Folder name "B" is also related to features m and n. Similarly, folder name "C" is also related to features n, y, and z. Thus, features m, n, y, and z are also grouped into the metafolder. As a result, the metafolder contains the folder names "A," "B," and "C" and the features m, n, x, y, and z. Subsequent metafolders are created by selecting a feature that is not grouped into an already created metafolder and performing the same grouping process. Thus, metafolders are created until all features and folders are grouped into discrete metafolders.

In another embodiment, the creation of the metafolders may begin by selecting a set of multiple features. All folder names that are related to the selected set of multiple features and the selected multiple features are grouped into a single metafolder. Next all other features that are related to the folder names within the metafolder are also grouped into the same metafolder. Subsequent metafolders may be created by selecting other sets of multiple features that are not grouped into an already created metafolder and performing the same grouping process.

In another embodiment, the creation of the metafolders may begin by selecting a folder name. All features that are related to the selected folder name and the selected folder name are grouped into a single metafolder. Next all other folder names that are related to the features within the metafolder are also grouped into the same metafolder. For example, folder name "D" is selected, which is related to features g, h, and j. Thus, folder name "D" and features g, h, and j are grouped into a single metafolder. Feature h is also related to folder names "E" and "F". Similarly, feature j is also related to folder names "E" and "Q." Thus, folder names "E," "F," and "Q" are also grouped into the metafolder. As a result, the metafolder will contain the features g, h, and j and folder names "D," "E," "F," and "Q." Subsequent metafolders are created by selecting a folder name that is not grouped into an already created metafolder and performing the same grouping process. Metafolders are created until all features and folders are grouped into discrete metafolders.

In another embodiment, the creation of the one or more metafolders may begin by selecting a set of multiple folder names. All features that are related to the selected set of multiple folder names and the selected multiple folder names are grouped into a single metafolder. Next all other folder names that are related to the features within the metafolder are also grouped into the same metafolder. Subsequent metafolders are created by selecting other sets of multiple folders that are not grouped into an already created metafolder and performing the same grouping process.

Once a metafolder is created, a metafolder name may be determined. The metafolder name is determined based on the folder names that are grouped in the metafolder. In one embodiment, the determined metafolder name may be the same as the folder name that contains the most messages within the user-generated message folders that are labeled the same as the folder name. In another embodiment, the determined metafolder name may be randomly selected from the folder names that are grouped in the metafolder. In another embodiment, the determined metafolder name may be the same as the folder name that has the most relationships with features that are grouped in the metafolder.

Once the plurality of folder names and the plurality of features are grouped into metafolders, process 500 proceeds to decision block 510, where a determination is made whether the cost of a solution is within a threshold of a theoretical optimal solution. In some embodiments the theoretical optimal solution may be based on a user confidence level. In one embodiment, the confidence level may be based on a number of changes made to the one or more metafolders. In another embodiment, the confidence level may be based on a number of times a folder name changes metafolders. In other embodiments, the theoretical optimal solution may be a mathematical calculation based on a number of folder names, a number of features, and a number of relationships. In one embodiment, the threshold is a determined value. In another embodiment, the threshold is a percentage of the theoretical optimal solution.

If the cost of the solution is not within the threshold of the theoretical optimal solution, then process 500 loops back to block 508 where different metafolders are generated. In one embodiment, the different metafolders are generated using a different grouping process embodiment. In another embodiment, the different metafolders are generated based on a previous metafolders solution and modifying the groups of folder names and features that are in the metafolders.

If the cost of the solution is within the threshold of the theoretical optimal solution, then process 500 ends at a return block, where the one or more metafolders are returned as the trained multi-class classifier, where each class in the multi-class classifier is a metafolder.

Process 500 of FIG. 5 may be further illustrated by the following non-limiting and non-exhaustive example. USER_1, USER_2, . . . , USER_4 all have individual message accounts. USER_1 generates a user generated folder with the name "banking" and moves a message with the subject "Bank of America statement" into that folder. USER_2 generates a user generated folder with the name "banking" and moves a message that contains the subject "Hello from Facebook" into that folder. USER_3 generates a user generated folder with the name "BofA" and moves a message that contains the subject "Bank of America statement" into that folder. USER_4 generates a user generated folder with the name "Facebook" and moves a message that contains the subject "Hello from Facebook" into that folder. In this example, the actions of creating the folders and moving the messages into folders may be monitored, at block 502, to obtain the folder names "banking," "BofA," and "Facebook." Similarly, monitoring the actions may provide the features "Bank of America statement," "Hello from Facebook."

The combinational optimization may then begin at block 504, where relationships may be generated. A relationship may be generated between the "Bank of America statement" feature and the "banking" folder name because the feature is contained in a message that is in the "banking" folder. Similarly, relationship may be generated between the "Hello from Facebook" feature and the "banking" folder name because the feature is contained in a message that is in the "banking" folder. Further, a relationship may be generated between the "Bank of America statement" feature and the "BofA" folder name because the feature is contained in a message that is in the "BofA" folder. Finally, a relationship may be made between the "Hello from Facebook" feature and the "Facebook" folder name because the feature is contained in a message that is in the "Facebook" folder.

Proceeding to block 506, relationship strengths are determined for these example relationships. An example of one determined relationship strength based on the above example follows. Now assume that one user has the user-generated folders named "banking." And in that one folder are 7 messages that contain the "Bank of America statement" feature. However, the "Bank of America statement" feature is in 15 different messages in the overall global system. Thus, the feature frequency for the folder name is 7 and the feature frequency for the overall global system is 15. These two frequencies may then be compared to determine the relationship strength value between the "Bank of America statement" feature and the "banking" folder name, such as the ration 7/15.

Continuing with the example above, metafolders are generated by grouping the folder names and the features. In one embodiment, two metafolders may be generated: METAFOLDER_1 and METAFOLDER_2. METAFOLDER_1 may contain the folder names "banking," and "BofA," and the feature "Bank of America statement." Where as METAFOLDER_2 may contain the folder name "Facebook" and the feature "Hello from Facebook." METAFOLDER_1 may be grouped in this way because the word "bank" appears in a folder name or in the feature and there is a relationship between one of the features and one of the folder names. Similarly, the word "Facebook" appears in the feature and folder name in METAFOLDER_2. In this example, the relationship between the folder name "banking" and the feature "Hello from Facebook" may be cut. Thus, the cost of this example solution may be the relationship strength of the cut relationship between the folder name "banking" and the feature "Hello from Facebook."

Using the One or More Metafolders

Figure 6:
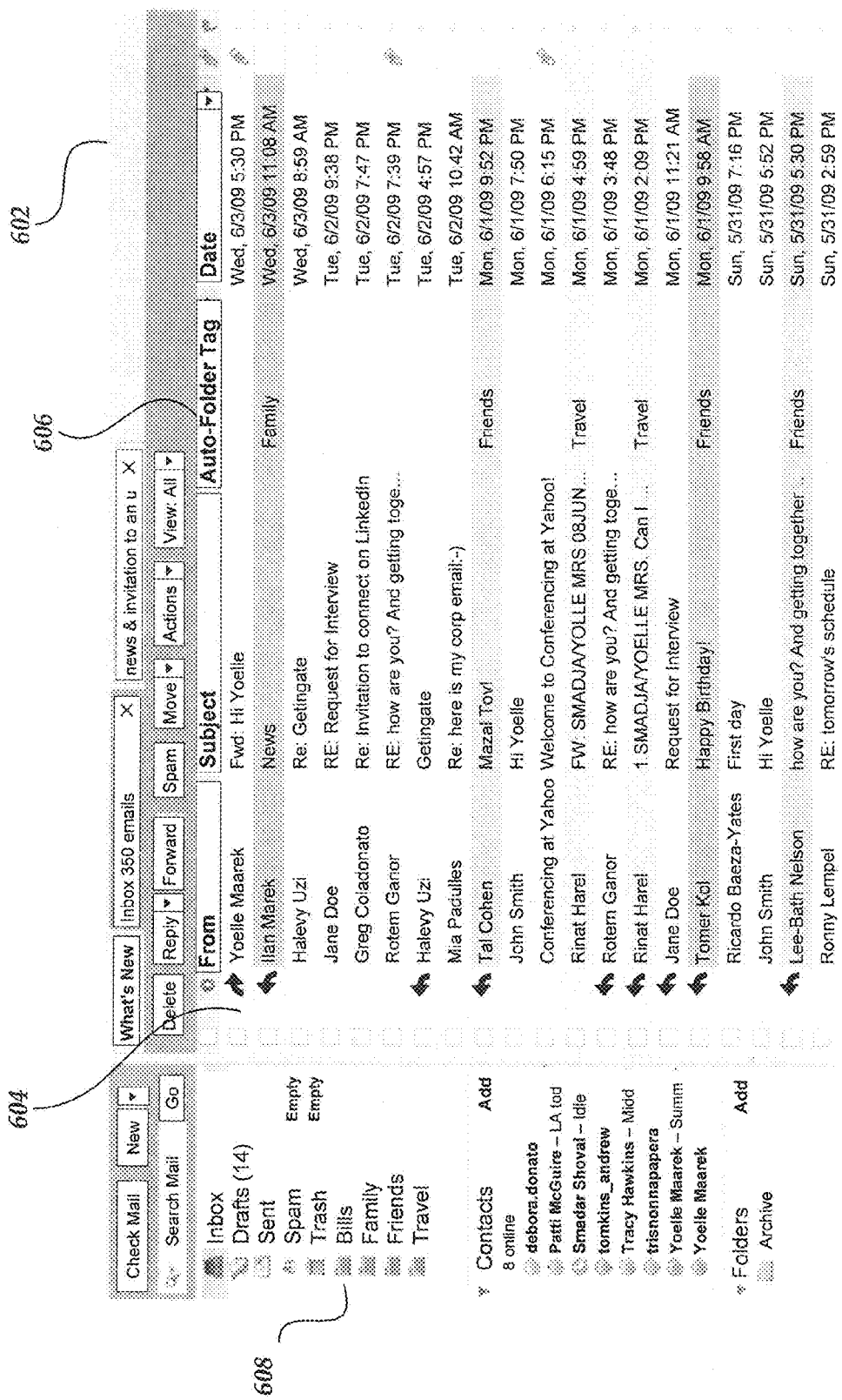
FIG. 6 shows one embodiment of a use case illustrating the use of auto-folder tags from one or more metafolders, such as that shown in FIG. 5.

FIG. 6 shows one embodiment of a use case illustrating the use of auto-folder tags from one or more metafolders, such as that shown in FIG. 5. As shown, individual message account 602 may contain different components, including second set of messages 604, auto-folder tag 606, or the like. In one embodiment, second set of messages 604 may be an individual message account inbox.

As described by process 500 of FIG. 5, one or more metafolders can be generated from a plurality of folder names and a plurality of features. The one or more metafolders may be utilized to tag at least one message in a second set of messages 604. In some embodiments, the tag may be an auto-folder tag 606. In some embodiments, the second set of messages 604 may include new user messages. In one embodiment, once the new user message is received by a user, the features of that message may be used to tag the new user message with one of the one or more metafolders. In some embodiments, the new message may be automatically tagged with an auto-folder tag 606 based on one of the one or more metafolders.

In some embodiments, a new user folder 608 may be created based on the metafolder utilized to tag the message. In one embodiment, the new user folder 608 may have the same folder name as the metafolder name, such as the same name as auto-folder tag 606. In another embodiment, the new user folder 608 may have a user generated folder name.

Figure 7:
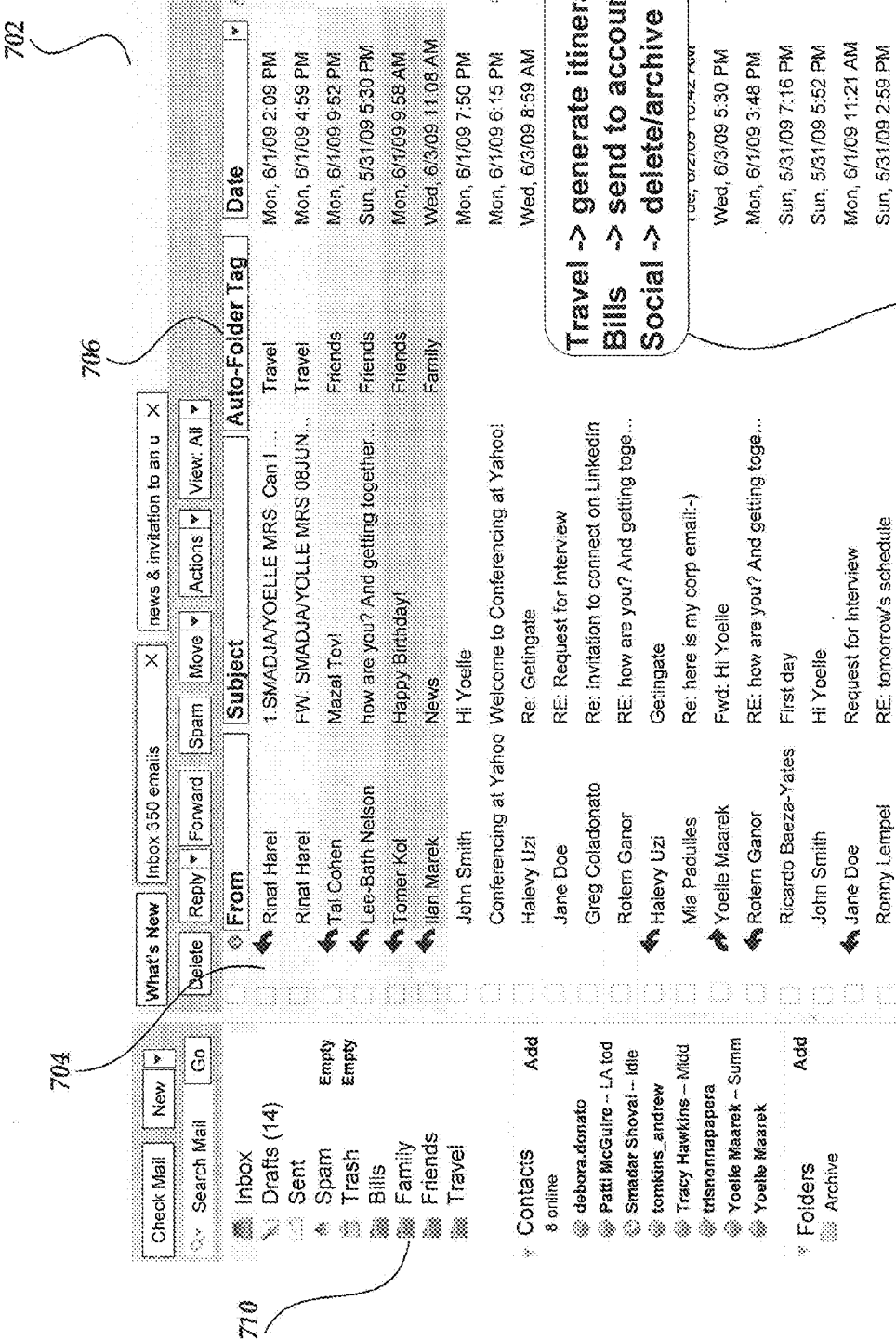
FIG. 7 shows one embodiment of a use case illustrating the use of auto-folder tags from one or more metafolders, such as that shown in FIG. 5.

FIG. 7 shows one embodiment of a use case illustrating the use of auto-folder tags from one or more metafolders, such as that shown in FIG. 5. As shown, individual message account 702 may contain different components, including second set of messages 704, auto-folder tag 706, or the like. In one embodiment, second set of messages 604 may be an individual message account inbox.

In some embodiments, auto-folder tag 706 may be utilized to perform additional message actions 708. In one embodiment, additional message actions 708 may include utilizing auto-folder tag 706 to automatically reply to the message, forward the message to another party, or the like. In another embodiment, additional message action 708 may include moving one of the second set of messages 704, deleting one of the second set of messages 704, archiving one of the second set of messages 704 or the like based on auto-folder tag 706. In one embodiment, the tagged message may be automatically moved to a user folder 710. In one embodiment, the tagged message may be moved to a new user folder, such as new user folder 608 of FIG. 6. In another embodiment, the tagged message may be moved to a previously made user generated folder based on the user generated folder name and the folder names grouped into the metafolder.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method operating on a network device, the method comprising:
    monitoring actions over a first set of messages by a plurality of users;
    employing the monitored actions by the plurality of users to generate metafolders for use by a user in the plurality of users using a combinational optimization approach of bi-clustering both folder names and features of the messages based on each relationship strength between at least the folder names and the features, cutting relationships between a plurality of the folder names and a plurality of message features when a folder name of a relationship and a message feature of the relationship are in separate metafolders, and regenerating the metafolders until a cost of cutting is within a confidence level that is based on an aggregate of relationship strengths of the cut relationships; and using the generated metafolders to automatically tag at least one message for the user with an auto-folder tag.

2. The method of claim 1, wherein the monitoring actions further comprises obtaining a plurality of folder names and a plurality of features from the plurality of users.

3. The method of claim 1, wherein the relationship strengths are based on a comparison of a feature frequency for a folder name with a feature frequency for a global system.

4. The method of claim 1, wherein the relationship strengths are based on a log likelihood ratio that estimates a relationship strength based on a previously determined relationship strength.

5. The method of claim 1, wherein the metafolders further comprise a hierarchy of metafolders based on a frequency of messages in the one or more metafolders.

6. A network device, comprising:
a transceiver to send and receive data over a network; and
a processor that is operative on the received data to perform actions, including:
monitoring the actions over a first set of messages by a plurality of users;
employing the monitored actions by the plurality of users to generate metafolders for use by a user in the plurality of users using a combinational optimization approach of bi-clustering both folder names and features of the messages based on each relationship strength between at least the folder names and the features, cutting relationships between a plurality of the folder names and a plurality of message features when a folder name of a relationship and a message feature of the relationship are in separate metafolders, and regenerating the metafolders until a cost of cutting is within a confidence level that is based on an aggregate of relationship strengths of the cut relationships; and
using the generated metafolders to automatically tag at least one message for the user with an auto-folder tag.

7. The network device of claim 6, wherein the monitoring actions further comprises obtaining a plurality of folder names and a plurality of features from the plurality of users.

8. The network device of claim 6, wherein the relationship strengths are based on a comparison of a feature frequency for a folder name with a feature frequency for a global system.

9. The network device of claim 6, wherein the relationship strengths are based on a log likelihood ratio that estimates a relationship strength based on a previously determined relationship strength.

10. The network device of claim 6, wherein the metafolders further comprise a hierarchy of metafolders based on a frequency of messages in the one or more metafolders.

11. A system, comprising:
at least one network device that manages a-communications over a network; and
one or more other network devices that are configured to perform actions, including:
monitoring the actions over a first set of messages by a plurality of users;
employing the monitored actions by the plurality of users to generate metafolders for use by a user in the plurality of users using a combinational optimization approach of bi-clustering both folder names and features of the messages based on each relationship strength between at least the folder names and the features, cutting relationships between a plurality of the folder names and a plurality of message features when a folder name of a relationship and a message feature of the relationship are in separate metafolders, and regenerating the metafolders until a cost of cutting is within a confidence level that is based on an aggregate of relationship strengths of the cut relationships; and
using the generated metafolders to automatically tag at least one message for the user with an auto-folder tag.

12. The system of claim 11, wherein the monitoring actions further comprises obtaining the plurality of folder names and the plurality of features from the plurality of users.

13. The system of claim 11, wherein the relationship strengths are based on a comparison of a feature frequency for a folder name with a feature frequency for a global system.

14. The system of claim 11, wherein the relationship strengths are based on a log likelihood ratio that estimates a relationship strength based on a previously determined relationship strength.

* * * * *